United States Patent
Wu et al.

(10) Patent No.: US 10,367,365 B2
(45) Date of Patent: Jul. 30, 2019

(54) METHOD FOR READING, WRITING, OR UPDATING INFORMATION FOR BATTERY CELL VIA CONNECTING INTERFACE BETWEEN PORTABLE DEVICE AND BATTERY PACK INCLUDING BATTERY CELL SO AS TO OBTAIN PRECISE INFORMATION

(71) Applicant: MEDIATEK INC., Hsin-Chu (TW)

(72) Inventors: Jui-Chi Wu, Taichung (TW); Chi-Ming Lee, Hsinchu (TW); Chih-Yuan Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/860,627

(22) Filed: Jan. 2, 2018

(65) Prior Publication Data

US 2018/0131195 A1 May 10, 2018

Related U.S. Application Data

(63) Continuation of application No. 14/895,928, filed as application No. PCT/CN2014/079811 on Jun. 13, 2014, now Pat. No. 9,893,547.

(Continued)

(51) Int. Cl.
*H02J 7/00* (2006.01)

(52) U.S. Cl.
CPC ............ *H02J 7/007* (2013.01); *H02J 7/0029* (2013.01); *H02J 7/0031* (2013.01);
(Continued)

(58) Field of Classification Search
CPC ................................ H02J 7/007; H02J 7/0029
(Continued)

(56) References Cited

U.S. PATENT DOCUMENTS 8,896,315 B1 * 11/2014 Davies .................. H02J 7/0016
324/434
2005/0077878 A1  4/2005 Carrier
(Continued)

FOREIGN PATENT DOCUMENTS

CN         101409456 A      4/2009
CN         101882701 A      11/2010
(Continued)

OTHER PUBLICATIONS

"International Search Report" dated Sep. 22, 2014 for International application No. PCT/CN2014/079811, International filing date: Jun. 13, 2016.
(Continued)

*Primary Examiner* — Suchin Parihar
(74) *Attorney, Agent, or Firm* — Winston Hsu

(57) ABSTRACT

A method used between a portable device and a battery pack including at least one battery cell includes: transmitting information for the battery cell from the portable device to the battery pack via the connecting interface or from the battery pack to the portable device via the connecting interface; and according to the information for the battery cell, performing at least one control operation that is associated with the battery cell; wherein there is an analog communication from the battery cell of the battery pack to the portable device to provide a voltage level actually from the battery cell.

24 Claims, 12 Drawing Sheets

Related U.S. Application Data

(60) Provisional application No. 61/909,483, filed on Nov. 27, 2013, provisional application No. 61/835,012, filed on Jun. 14, 2013.

(52) U.S. Cl.
CPC . *H02J 2007/004* (2013.01); *H02J 2007/0037* (2013.01); *H02J 2007/0039* (2013.01); *H02J 2007/0098* (2013.01)

(58) Field of Classification Search
USPC ........................................................ 320/162
See application file for complete search history.

(56) References Cited

U.S. PATENT DOCUMENTS

| | | | |
|---|---|---|---|
| 2005/0275983 A1* | 12/2005 | Franklin | B60L 11/1887 361/56 |
| 2007/0103113 A1 | 5/2007 | Embrey | |
| 2008/0309291 A1 | 12/2008 | Cha | |
| 2009/0051324 A1* | 2/2009 | Nakatsuji | H01M 10/441 320/134 |
| 2010/0097118 A1 | 4/2010 | Wang | |
| 2010/0194348 A1 | 8/2010 | Wang | |
| 2011/0107120 A1 | 5/2011 | Nakashima | |
| 2011/0267009 A1 | 11/2011 | Nakatsuji | |
| 2013/0020875 A1 | 1/2013 | Wozniak | |
| 2013/0134944 A1 | 5/2013 | Son | |
| 2013/0200841 A1 | 8/2013 | Farkas | |
| 2013/0314047 A1 | 11/2013 | Eagle | |
| 2014/0167700 A1 | 6/2014 | Chen | |

FOREIGN PATENT DOCUMENTS

| | | |
|---|---|---|
| CN | 102055219 A | 5/2011 |
| CN | 102859825 A | 1/2013 |
| CN | 102957193 A | 3/2013 |
| CN | 103872719 A | 6/2014 |
| JP | 2014113001 | 6/2014 |
| WO | 2013112610 A1 | 8/2013 |
| WO | 2014198231 A1 | 12/2014 |

OTHER PUBLICATIONS

Wu, Title of Invention: Scheme for Activating or Deactivating Shipping Mode for Battery Via Battery Connecting Interface Without Additional Signal Port(s), U.S. Appl. No. 14/822,877, filed Aug. 10, 2015.

Wu, Title of Invention: Method for Reading, Writing, or Updating Information for Battery Cell Via Connecting Interface Between Portable Device and Battery Pack Including Battery Cell so as to Obtain Precise Information, U.S. Appl. No. 14/895,928, filed Dec. 3, 2015.

* cited by examiner

METHOD FOR READING, WRITING, OR UPDATING INFORMATION FOR BATTERY CELL VIA CONNECTING INTERFACE BETWEEN PORTABLE DEVICE AND BATTERY PACK INCLUDING BATTERY CELL SO AS TO OBTAIN PRECISE INFORMATION

CROSS REFERENCE TO RELATED APPLICATION

This continuation application claims the benefit of U.S. application Ser. No. 14/895,928, filed on 2015 Dec. 3, which is a national state entry of PCT/CN2014/079811 (2014 Jun. 13) which claims the benefit of U.S. Provisional Application No. 61/835,012, filed on 2013 Jun. 14, and the benefit of U.S. Provisional Application No. 61/909,483, filed on 2013 Nov. 27.

BACKGROUND

The present invention relates to a battery scheme, and more particularly to a method for communicating a portable device with a battery cell or an internal circuit of a battery pack.

Generally speaking, for a conventional scheme, a portable device such as a smart phone device cannot obtain voltage information actually from a battery cell included within a battery pack. The portable device is merely capable of obtaining a voltage level from an external port of the battery pack. Usually, there exists a significant voltage drop between the voltage level from the external port of the battery pack and a voltage level obtained actually from a battery cell. Thus, it is inaccurate to refer to the voltage level from the external port of the battery pack for charging or discharging the battery cell. The conventional scheme may cause a longer waiting time period for charging the battery cell to be full and a poor rate for battery power utilization. In addition, the conventional scheme fails to provide solutions for solving the problems of temperature change, the battery cell being removed, and etc.

SUMMARY

Therefore one of the objectives of the present invention is to provide a method for transmitting precise information for a battery cell from a portable device to a battery pack via a connecting interface such as a battery interface or from the battery pack to the portable device via the connecting interface, to solve the problems mentioned above.

According to an embodiment of the invention, a portable device connected to a battery pack via a connecting interface is disclosed. The battery pack comprises at least one battery cell, and the portable device comprises a transmitting circuit and a control circuit. The transmitting circuit is used for transmitting signals from the connecting interface to a control circuit or from the control circuit to the connecting interface. The control circuit is coupled to the transmitting circuit and used for performing at least one control operation that is associated with the battery cell according to information for the battery cell. There is an analog communication from the battery cell of the battery pack to the portable device to provide a voltage level actually from the battery cell.

According to an embodiment of the invention, a battery pack connected to a portable device via a connecting interface is disclosed. The battery pack comprises a battery cell and an internal circuit. The internal circuit is coupled to the battery cell and used for transmitting information for the battery cell from the battery pack to the portable device via the connecting interface. The information for the battery cell comprises at least one of information actually from the battery cell and information that has been stored by the internal circuit. There is an analog communication from the battery cell of the battery pack to the portable device to provide a voltage level actually from the battery cell.

According to an embodiment of the invention, a method used between a portable device and a battery pack including at least one battery cell is disclosed. The method comprises: transmitting information for the battery cell from the portable device to the battery pack via the connecting interface or from the battery pack to the portable device via the connecting interface; and, according to the information for the battery cell, performing at least one control operation that is associated with the battery cell. There is an analog communication from the battery cell of the battery pack to the portable device to provide a voltage level actually from the battery cell.

According to embodiments of the invention, the portable device can obtain/read precise information for the battery cell from the battery cell and/or from the internal circuit of the battery pack. In addition, the portable device can write/update information for the battery cell that has been stored by the internal circuit. In addition, the internal circuit can notify the portable device of the information of battery cell. These operations achieve that the whole system can support/provide control functions/operations of fast charging, improving battery utilization, battery existence detection, smart battery detection, low-cost battery detection, identification detection/monitoring, precise temperature detection/monitoring, battery gauge detection, adaptively controlling pre-charging current, battery protection enhancement, battery shipping mode, and so on.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
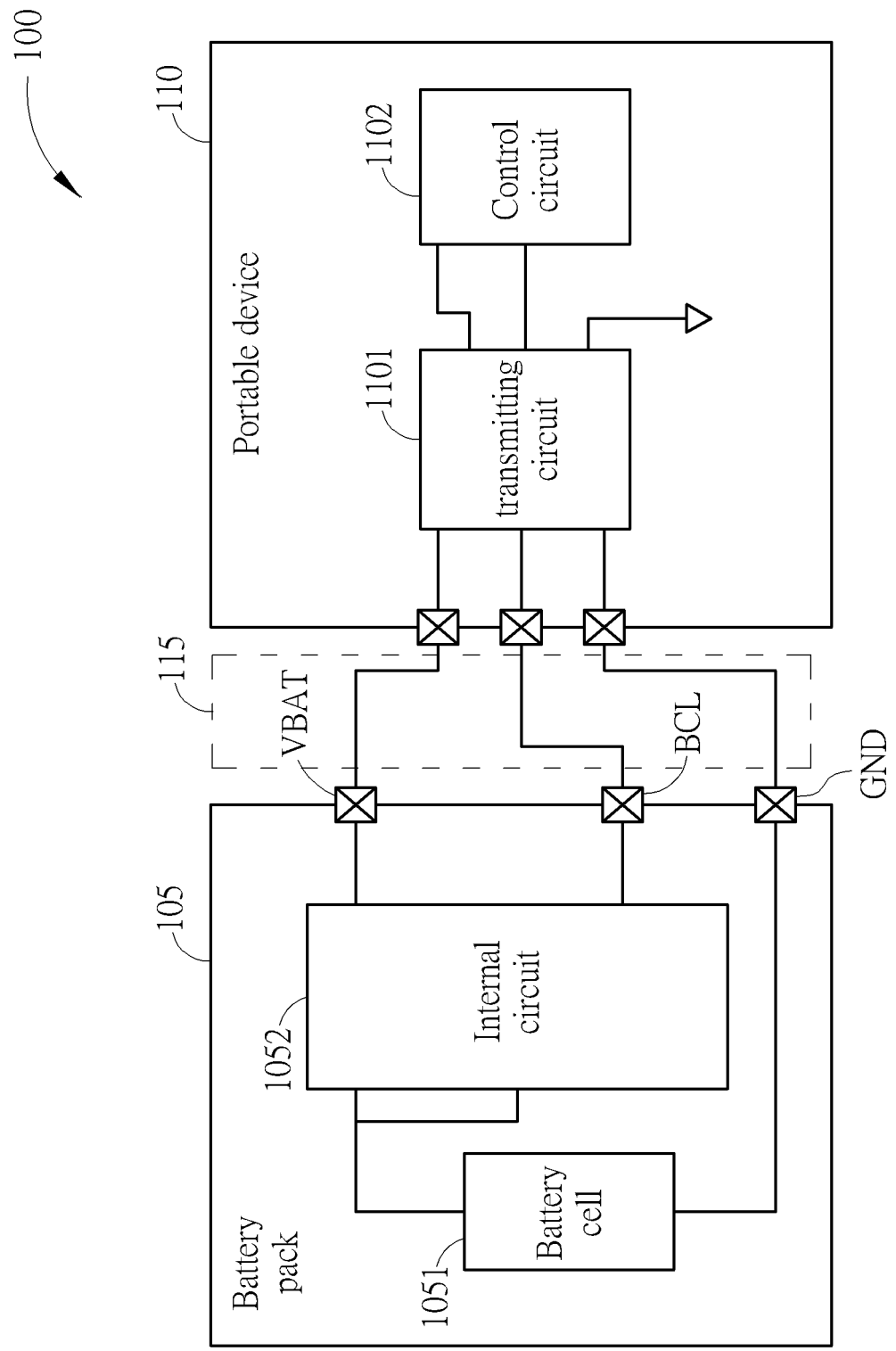
FIG. 1 is a diagram of a system according to embodiments of the invention.

FIG. 1 is a diagram of a system 100 according to embodiments of the invention. The system 100 comprises a battery pack 105 and a portable device 110 coupled to the battery pack 105 via a connecting interface 115. The battery pack 105 comprises at least one battery cell 1051 and an internal circuit 1052 that is coupled to the battery cell 1051. The battery cell 1051 may comprise a single cell unit or a plurality of cell units that may be connected in serial or in parallel. The portable device 110 comprises a transmitting circuit 1101 and a control circuit 1102. The portable device 110 communicates with the battery pack 105 via the connecting interface 115. For the portable device 110, the transmitting circuit 1101 is used for transmitting signals from the connecting interface 115 to the control circuit 1102 and/or from the control circuit 1102 to the connecting interface 115. When the information for battery cell 1051 is transmitted from the battery pack 105 to the portable device 110, the control circuit 1102 receives the information for battery cell 1051 from the transmitting circuit 1101 via the connecting interface 115. That is, the control circuit 1102 can read the information for battery cell 1051 from the internal circuit 1052 of battery pack 105 via the transmitting circuit 1101 and the connecting interface 115. The control circuit 1102 can write the information for battery cell 1051 into the internal circuit 1052 of battery pack 105 via the transmitting circuit 1101 and the connecting interface 115. The control circuit 1102 can update the information for battery cell 1051 that has been stored by the internal circuit 1052 of battery pack 105 via the transmitting circuit 1101 and the connecting interface 115. According to information for the battery cell 1051, the control circuit 1102 can perform at least one control operation that is associated with the battery cell 1051. Additionally, for the battery pack 105, the internal circuit 1052 is used for transmitting information for the battery cell 1051 from the battery pack 105 to the portable device 110 via the connecting interface and/or receiving information for the battery cell 1051 from the portable device 110 to the battery pack 105 via the connecting interface. The information for the battery cell 1051 comprises at least one of information actually from the battery cell 1051, information that has been stored by the internal circuit 1052, and information calculated by the portable device 110 for the battery cell 1051.

Specifically, the information for battery cell 1051 comprises information for at least one of a voltage level from the battery cell, control data, battery percentage, aging factors, battery cycle, battery capacity, over-charge voltage protection, over-discharge voltage protection, discharge over-current protection, charge over-current protection, short-circuit protection, and a pre-charging current for initially charging. The system 100 supports/provides at least one of control functions/operations of fast charging, improving battery utilization, battery existence detection, smart battery detection, low-cost battery detection, identification detection/monitoring, precise temperature detection/monitoring, battery gauge detection, adaptively controlling pre-charging current, battery protection enhancement, battery shipping mode, and so on. The system 100 can integrate all the operations and functions mentioned above. These functions are performed/achieved by the portable device 110 to communicate with the internal circuit 1052 of battery pack 105 via the connecting interface 115 to obtain, process, and/or access precise information related to battery cell 1051. The precise information may comprise precise information (e.g. voltage level) actually from the battery cell 1051 and/or precise information stored by the internal circuit 1052. In practice, the connecting interface 115 can be implemented by using a variety of connecting interface standards. For example, the connecting interface 115 can be a port of power line VBAT and/or a port of battery interface (BIF) specified by MIPI (Mobile Industry Processor Interface) Alliance. If the connecting interface 115 is implemented by using the port of power line VBAT, information from portable device 110 is received by the internal circuit 1052 via the port of power line VBAT. If the connecting interface 115 is implemented by using the port of battery interface, the information from portable device 110 is received by the internal circuit 1052 via the port of battery communication line BCL. The signals between the transmitting circuit 1101 and control circuit 1102 can be transferred via different standards such as MIPI battery interface (BIF), multi-drop bus, HDQ communication, SDQ communication, DQ communication, I²C communication, and so on. The standard between transmitting circuit 1101 and control circuit 1102 can also be defined by users. The transmitting circuit 1101 is used for signal transferring/converting for signals transmitted between the portable device 110 and battery pack 105. The communication between portable device 110 and battery pack 105 can be wireless communication, digital communication, wire communication, or analog communication via the connecting interface 115.

Figure 2:
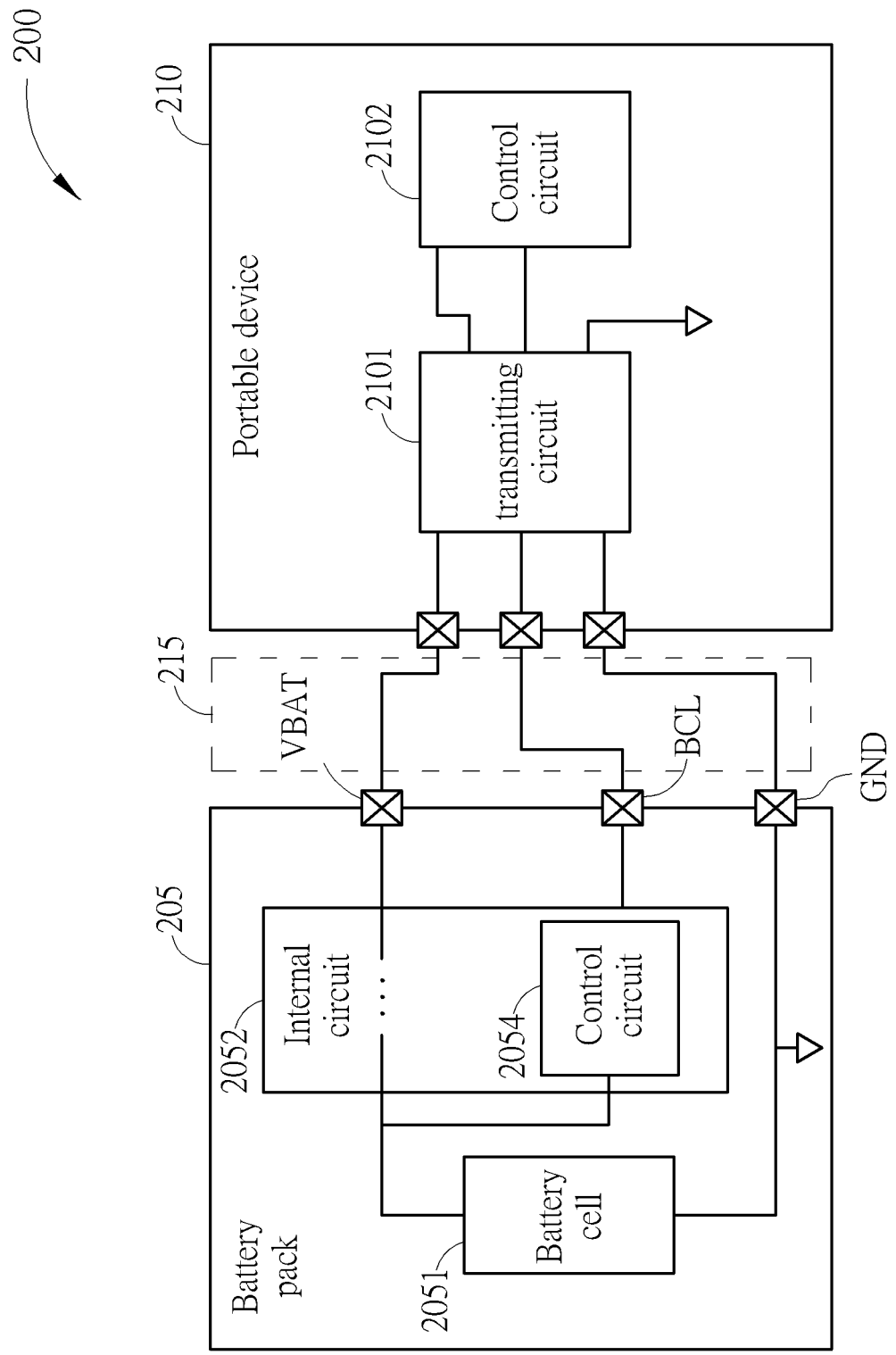
FIG. 2 is a diagram of a system according to a first embodiment of FIG. 1.

FIG. 2 is a diagram of a system 200 according to a first embodiment of FIG. 1. The internal circuit 2052 comprises a control circuit 2054. The control circuit 2054 is coupled to the battery cell 2051 and battery communication line BCL. The control circuit 2054 directly senses and detects information (e.g. voltage information) of the battery cell 2051, and the portable device 210 obtains the information of the battery cell 2051 by using the control circuit 2102 to communicate with the control circuit 2054 via the transmitting circuit 2101 and the connecting interface 215. By doing this, the control circuit 2102 at the side of portable device 210 can obtain precise voltage information actually from battery cell 2051. According to the precise voltage information actually from battery cell 2051, the control circuit 2102 can adjust the charging/discharging current for the battery cell 2051 so as to compensate a voltage drop on the discharging/charging path within the battery pack 205. This can improve the efficiency of battery cell utilization and reduce the total charging waiting time for fast charging function.

The control circuit 2054 detects/measures the voltage information actually from the battery cell 2051, stores the voltage information (e.g. a voltage level being currently provided from the battery cell 2051), and then compares the detected/measured voltage level with a target threshold to determine whether to trigger/generate an interrupt event/signal to the control circuit 2102 via the connecting interface 215. That is, information for battery cell 2051 may comprise an interrupt event/signal transmitted from the battery pack 205 to the portable device 210 via the connecting interface 215, and the control circuit 2102 at the side of portable device 210 is arranged to perform at least one control operation (e.g. current adjusting) when receiving the interrupt event/signal. In a first example of this embodiment, the interrupt event/signal is a high voltage interrupt event/ signal, and the target threshold is designed as a high voltage threshold for the battery cell 2051 when the battery cell 1051 is being charged under a constant current mode (not limited); this high voltage threshold can be also regarded as an over-high voltage threshold. The voltage level from the battery cell 2051 becomes higher gradually when battery cell 2051 is being charged. If the detected/measured voltage level from battery cell 2051 reaches the high voltage threshold, the control circuit 2054 generates the high voltage interrupt event/signal to the control circuit 2102 via the connecting interface 215. After the control circuit 2102 at the side of portable device 210 receives the high voltage interrupt event/signal, the portable device 210 performs mode switching. The portable device 210 determines that the system 200 exits the constant current mode and enters a constant voltage mode. Under the constant current mode, the battery cell 2051 is charged with a larger current, and under the constant voltage mode the battery cell 2051 is charged with a smaller current. That is, the control circuit 2102 within portable device 210 controls a current used for charging the battery cell 2051 to decrease this current when receiving the high voltage interrupt event/signal, so as to use a smaller current for charging the battery cell 2051. Since the mode switching occurs when the detected/measured voltage level actually from battery cell 2051 reaches the high voltage threshold, the time period for charging the battery cell 2051 with a larger current under constant current mode can be extended slightly, so that the time period for charging the battery cell 2051 with a smaller current under constant voltage mode can be significantly reduced. Thus the total waiting time period for charging battery cell 2051 is reduced. By slightly extending the waiting time period under the constant current mode, the portable device 210 can reduce the total waiting time period for charging the battery cell 2051, to achieve the function of fast charging.

In addition, the control circuit 2054 may be arranged to measure/detect the voltage level of the battery cell 2051 and transfers/transmits the measured/detected voltage level to the control circuit 2102 via the connecting interface and the communication circuit 2101. That is, the control circuit 2054 may transmit an analog signal carrying the voltage level to the control circuit 2102 via the connecting interface and the transmitting circuit 2101. The transmitting circuit 2101 can use an analog-to-digital converter (ADC) to convert the analog signal into a digital signal carrying the voltage level, and the control circuit 2102 compares the digital signal carrying the voltage level with the value of high voltage threshold to determine whether to perform mode switching. That is, information for battery cell 2051 may comprise a voltage level actually from battery cell 2051, and the control circuit 2102 within portable device 210 compares the received voltage level with the high voltage threshold to determine whether to perform a control operation for the battery cell 2051 when receiving the voltage level actually from battery cell 2051 via the connecting interface 215. The operation for controlling the control circuit 2054 to detect/measure the voltage information of battery cell 2051 can be made by the internal circuit 2052 itself or by the control circuit 2102 at the side of portable device 210. The control circuit 2102 may control the control circuit 2054 to detect/measure the voltage level by sending a control enable signal to the internal circuit 2052 via the connecting interface 215. The interrupt event/signal can be transmitted via the BCL of the battery interface or via the power line VBAT. That is, the control circuit 2102 can communicate with the battery pack 205 via the power line VBAT so that the portable device 210 can reduce the total waiting time period for charging the battery cell 2051 by extending the time period under the constant current mode.

Figure 3A:
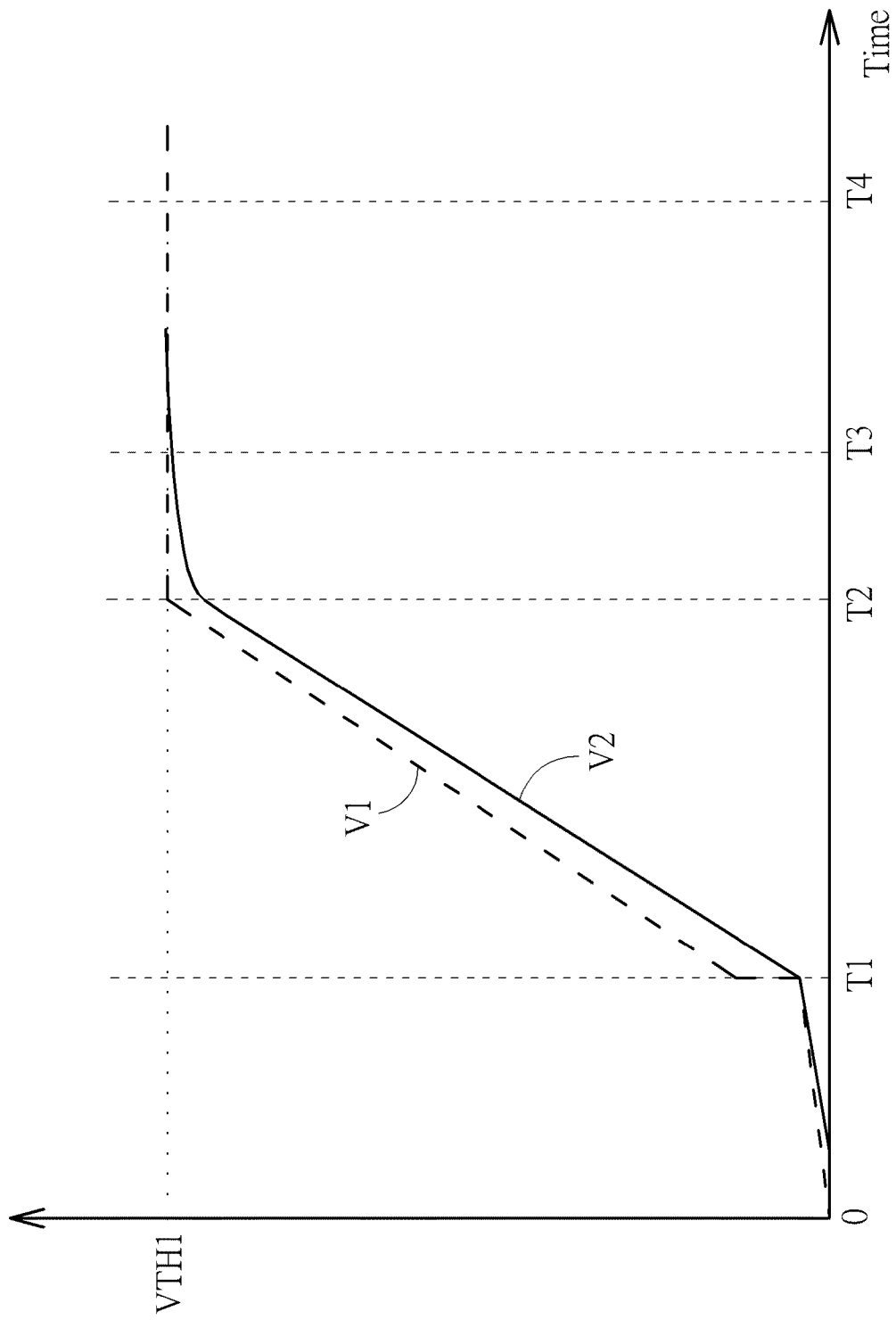
FIG. 3A is a diagram illustrating an example of I-V curve for a battery by using a conventional scheme to charge the battery.

In the following, in order to more clearly show the advantages of fast charging, a description for a comparison between a conventional scheme and the scheme employed by the system 200 is described in the following. FIG. 3A is a diagram illustrating an example of I-V curve for a battery by using a conventional scheme to charge the battery. For the conventional scheme, a voltage level at a power line is compared with the high voltage threshold to determine whether to perform mode switching and decrease a current for charging a battery. The conventional scheme starts to charge a battery by using a large current at timing T1. As shown in FIG. 3A, the curve V1 shows that the voltage level at a power line is gradually raised up from timing T1 to timing T2, and the curve V2 shows that the voltage level actually from a cell within the battery is gradually raised up. However, there exists a significant voltage drop between voltage level actually from the cell within the battery and a voltage level at the power line. At timing T2 when the voltage level at the power line reaches the high voltage threshold VTH1 such as 4.2 Volts, the conventional scheme determines to exit the constant current mode and enter the constant voltage mode. The time interval between timings T1 and T2 is a waiting time period for charging the battery under the constant current mode based on the conventional scheme. However, at the timing T2, the voltage level actually from the cell within the battery does not reach the high voltage threshold VTH1 due to the significant voltage drop. For example, the voltage level actually from the cell may merely reach 3.9 Volts or 3.8 Volts at most. This indicates that the cell is not yet fully charged. In order to bring the battery to a full charge condition, it is necessary for the conventional scheme to wait a longer time period for charging the cell under the constant voltage mode. For example, the time interval between timings T2 and T4 indicates a waiting time period for charging the battery under the constant voltage mode by using the conventional scheme; the waiting time period becomes longer if the voltage drop becomes larger. Accordingly, a total longer waiting time period for charging the battery cannot be avoided if the conventional scheme is used.

Figure 3B:
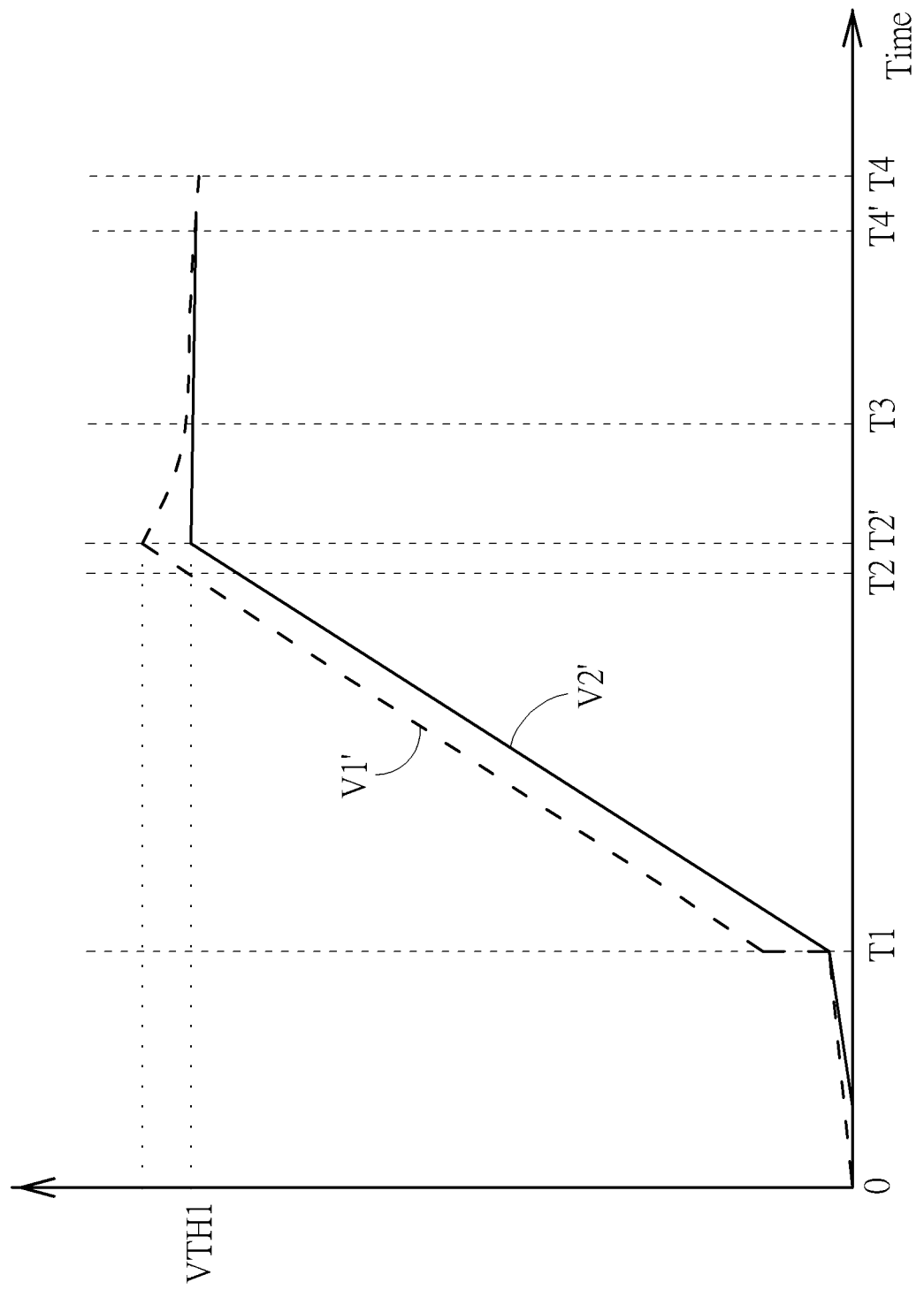
FIG. 3B is a diagram illustrating an example of I-V curve for the battery cell when charging the battery cell according to the embodiment shown in FIG. 2.
Figure 3C:
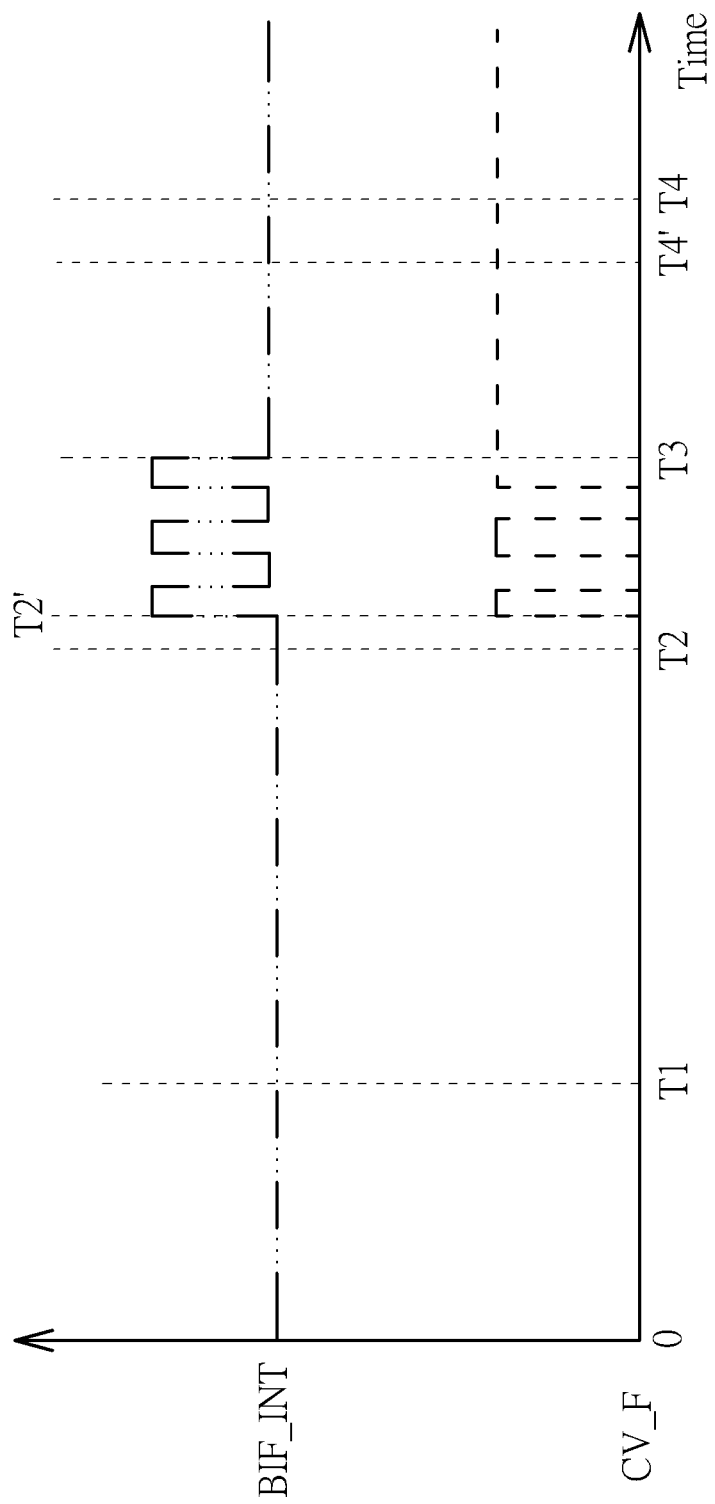
FIG. 3C is a diagram illustrating an example of mode switching for the example of I-V curve as shown in FIG. 3B.

Compared to the conventional scheme, FIG. 3B is a diagram illustrating an example of I-V curve for the battery cell 2051 when charging the battery cell 2051 according to the embodiment shown in FIG. 2. FIG. 3C is a diagram illustrating an example of mode switching for the example of I-V curve as shown in FIG. 3B. As shown in FIG. 3B, at timing T1, the portable device 210 starts and controls an operation for charging the battery cell 2051 by using a large current under the constant current mode. The curve V2' shows that the voltage level actually from the battery cell 2051 is gradually raised up, and the curve V1' shows that the voltage level at the port of power line VBAT is gradually raised up. The control circuit 2054 of internal circuit 2052 is arranged to detect/measure the voltage level actually from the battery cell 2051 and compare the detected/measured voltage level with the high voltage threshold VTH1 such as 4.2 Volts to determine whether to generate an interrupt event/signal to the control circuit 2102 at the side of portable device 210 via the connecting interface 215. Once receiving the interrupt event/signal, the control circuit 2102 at the side of portable device 210 determines to perform mode switching from the constant current mode to the constant voltage mode.

Practically, at timing T2, the voltage level at the port of power line VBAT reaches the high voltage threshold VTH1, but the voltage level actually from the battery cell 2051 does not yet reach the high voltage threshold VTH1. By comparing the voltage level actually from the battery cell 2051 with the high voltage threshold VTH1, the control circuit 2054 does not generate an interrupt event/signal at this time, and the control circuit 2102 does not perform mode switching at timing T2 to exit the constant current mode. The control circuit 2102 performs mode switching at timing T2' later than timing T2 since the voltage level actually from the battery cell 2051 reaches the high voltage threshold VTH1 at timing T2'. The time interval between timings T1 and T2' is a waiting time period for charging the battery cell 2051 under the constant current mode based on the control operation of portable device 210. The system 200 exits the constant current mode and then enters the constant voltage mode. That is, the system 200 performs mode switching for charging the battery cell 2051. Under the constant voltage mode, the portable device 210 merely needs a shorter waiting time period for charging the battery cell 2051 to be full. For example, the time interval between timings T2' and T4' indicates a shorter waiting time period for charging the battery cell 2051 under the constant voltage mode by using the control of portable device 210; the timing T4' is earlier than the timing T4, and accordingly the waiting time period from T2' to T4' is shorter than the time period from T2 to T4. As a result, it is merely needed to wait a shorter time period for charging the battery cell 2051 to be full if the portable device 210 is employed. As shown in FIG. 3C, BIF_INT shows that the battery pack 205 at timing T2' triggers/generates an interrupt event/signal to the portable device 210 via the connecting interface 215, and the CV_F shows that the portable device 210 or the system 200 at timing T2' exits the constant current mode and enters the constant voltage mode.

Additionally, in a second example of the embodiment of FIG. 2, the interrupt event/signal is a low voltage interrupt event/signal, and the target threshold is designed as a low voltage threshold for the battery cell 2051 when the battery cell 2051 is used for discharging and providing power (not limited); this low voltage threshold can be also regarded as an over-low voltage threshold. The voltage level actually from the battery cell 2051 becomes lower gradually when battery cell 2051 is being discharged and is supplying power. The control circuit 2054 of internal circuit 2052 compares the measured/detected voltage level from the battery cell 2051 with the low voltage threshold to determine whether to trigger/generate and transmit the low voltage interrupt event/signal to the control circuit 2102 of portable device 210 via the connecting interface 215. For example, the low voltage threshold may be designed as 3.4 Volts. The battery cell 2051 provides a current for the portable device 210, and the portable device 210 determines to shut down if the power of battery cell 2051 is not enough. When detecting that the voltage level actually from the battery cell 2051 becomes lower and reaches the low voltage threshold, the control circuit 2102 controls a current used for charging the portable device 210 to decrease this current, so as to make the portable device 210 shut down. By comparing the voltage level actually from the battery cell 2051 with the low voltage threshold, the control circuit 2054 of internal circuit 2052 transmits the low voltage interrupt event/signal to the portable device 210 via the connecting interface 215 when the voltage level actually from the battery cell 2051 reaches the low voltage threshold. When receiving the low voltage interrupt event/signal, the portable device 210 or the system 200 determines to shut down.

Figure 3D:
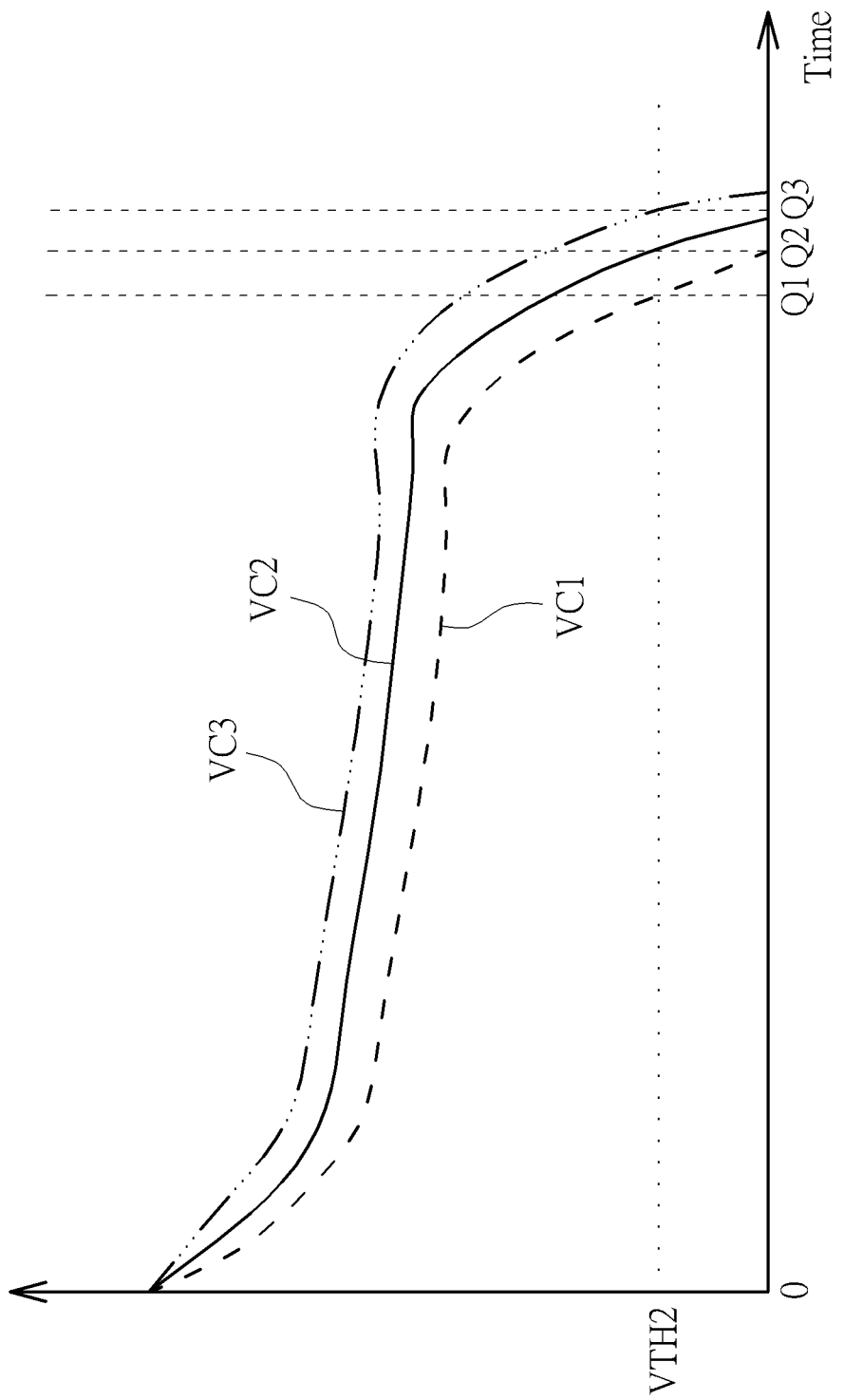
FIG. 3D is a diagram illustrating an example of total battery power usage for different conditions.
Figure 3E:
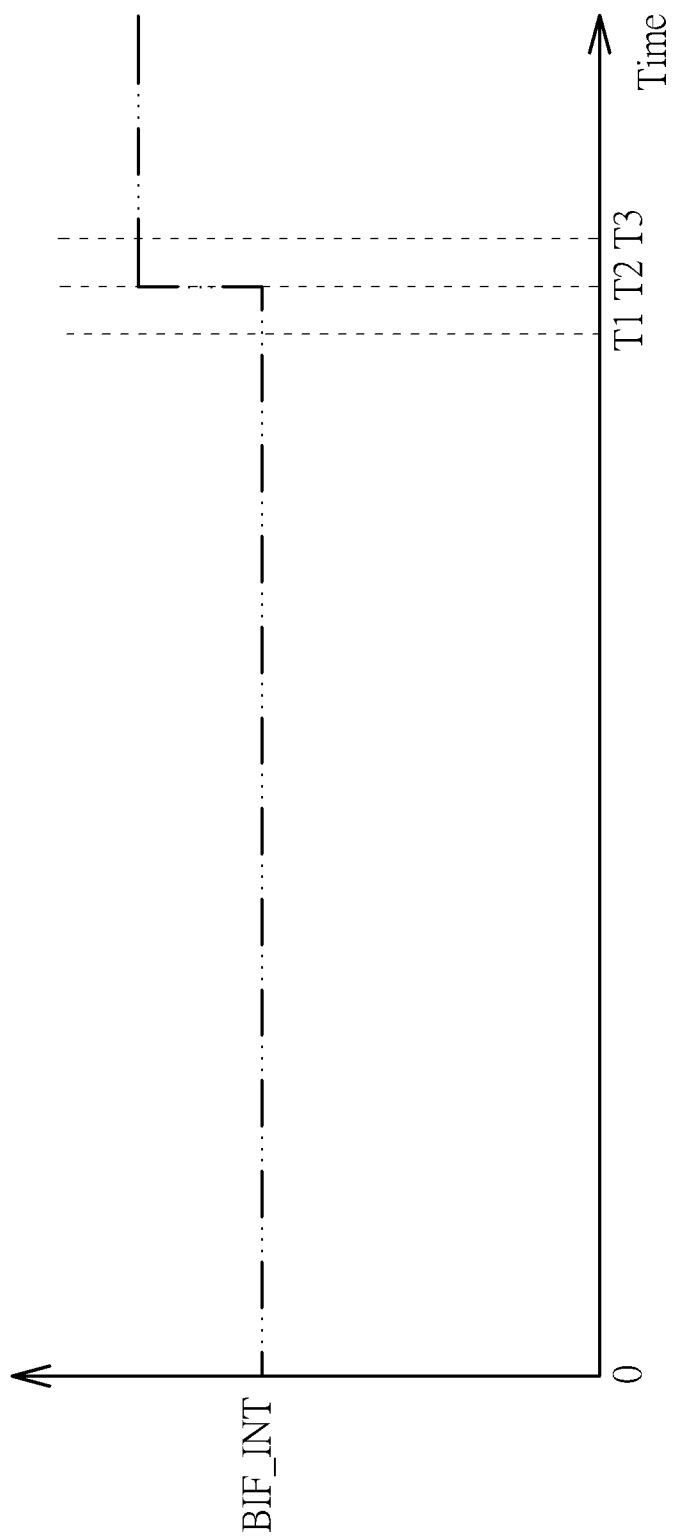
FIG. 3E is a diagram illustrating different timings for portable device to start to shut down according to the examples as shown in FIG. 3D.

FIG. 3D is a diagram illustrating an example of total battery power usage for different conditions. FIG. 3E is a diagram illustrating different timings for portable device 210 to start to shut down according to the examples as shown in FIG. 3D. As shown in FIG. 3D, the vertical axis indicates a voltage level, and the horizontal axis indicates the total battery power usage that can be provided for the portable device 210. The curve VC3 indicates an ideal relation between voltage level and total battery power usage provided for the portable device 210. The curve VC2 indicates a relation between the voltage level actually from battery cell 2051 and total battery power usage provided for the portable device 210. The curve VC1 indicates a relation between voltage level at the port of power line VBAT and total battery power usage provided for the portable device 210. Since the battery cell 2051 is discharging, these voltage levels become lower gradually with time. Q3 shows the total battery power usage that ideally can be provided for the portable device 210. That is, Q3 is the maximum battery power usage ideally provided for the portable device 210. Q2 indicates the total battery power usage that can be provided for the system 100 by comparing the voltage level actually from battery cell 2051 with the low voltage threshold VTH2 such as 3.4 Volts. Q1 indicates the total battery power usage that can be provided for the system 200 if the voltage level at the port of power line VBAT is compared with the low voltage threshold VTH2 to determine the timing to start to shut down. As shown in FIG. 3D, by comparing the voltage level actually from battery cell 2051 with the low voltage threshold VTH2, the system 200 or portable device 210 does not determine to shut down too early, and the total battery power usage can be improved. As shown in FIG. 3E, the BIF_INT shows that the control circuit 2054 transmits an interrupt event/signal to the control circuit 2102 of portable device 210 at timing T2 corresponding to the curve VC2 of FIG. 3D.

Figure 4:
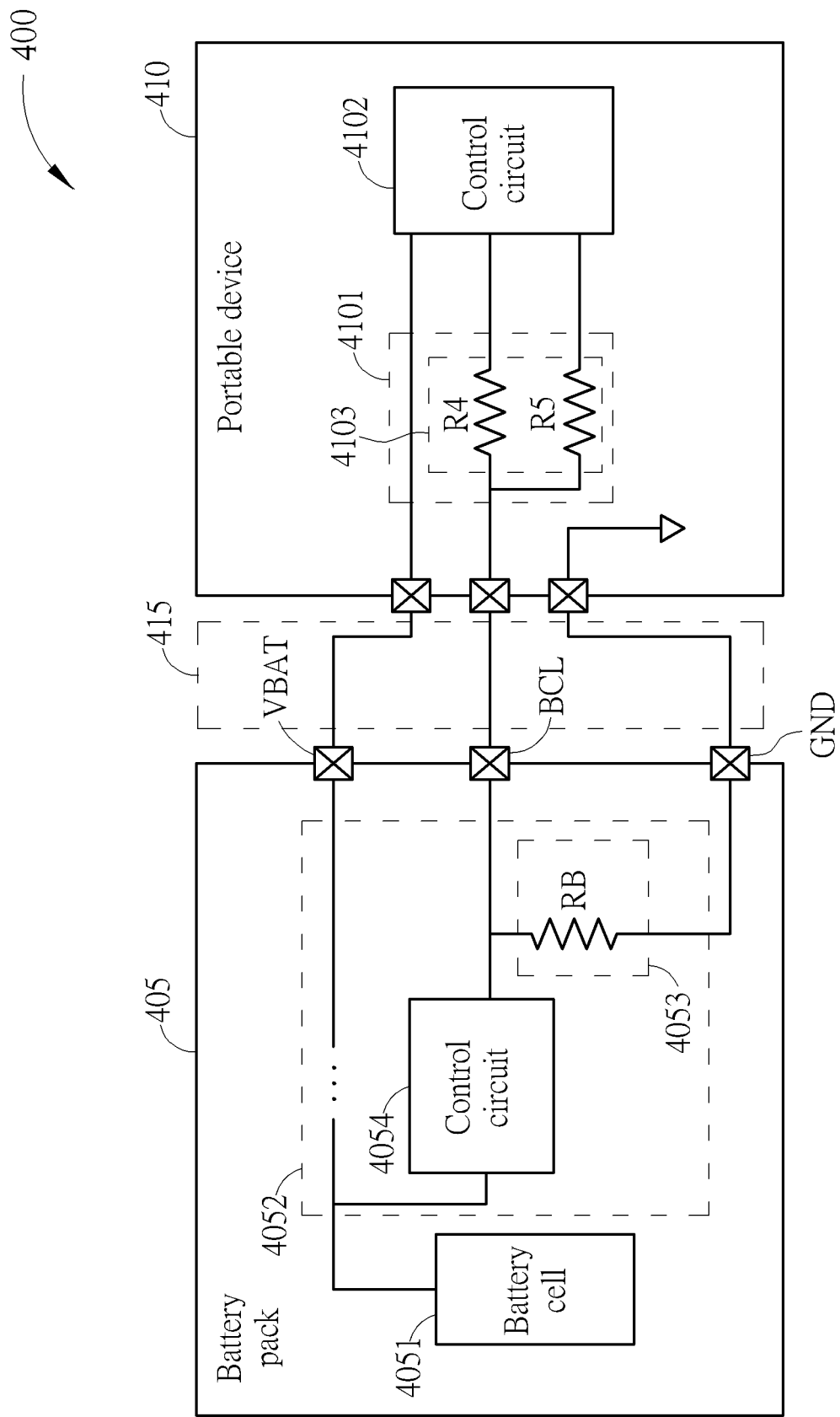
FIG. 4 is a diagram of a system according to a second embodiment of FIG. 1.

Further, in another embodiment of the invention, the information for a battery cell may comprise at least one of identification information of the battery cell and temperature information of the battery cell. The control circuit of the portable device can sense at least one of the identification information and the temperature information by detecting a voltage dividing result generated by the transmitting circuit and the battery pack, and can perform at least one of battery existence detection and temperature protection according to the sensed at least one of the identification information and the temperature information. FIG. 4 is a diagram of a system 400 according to a second embodiment of FIG. 1. The system 400 comprises a battery pack 405 and a portable device 410. The battery pack 405 comprises a battery cell 4051 and an internal circuit 4052. The portable device 410 comprises a transmitting circuit 4101 and a control circuit 4102. The internal circuit 4052 comprises a resistor circuit 4053 and a control circuit 4054, and the transmitting circuit 4101 comprises a resistor unit 4103. The control circuit 4054 can be used as a slave circuit in this embodiment, and the control circuit 4102 can be used as a master circuit; however, this is not intended to be a limitation of the invention. The resistor circuit 4053 includes an equivalent resistance value RB which is formed by a temperature sensing resistor such as NTC resistor, an identification sensing resistor, or a combination of the temperature sensing resistor and identification sensing resistor that can be connected in series or in parallel. The temperature sensing resistor can be implemented by using a thermistor installed around the battery cell 4051 wherein the thermistor can provide a resistance value that correspondingly varies with temperature information of the battery cell 4051 for measuring the information of the battery cell 4051. The resistance of temperature sensing resistor varies with the temperature associated with the battery pack 405 or the battery cell 4051, and the resistance of identification sensing resistor varies with an identification of the battery cell 4051. The portable device 410 obtains the information of the internal circuit 4052 by using the control circuit 4102 to communicate with the internal circuit 4052 via the transmitting circuit 4101 and the connecting interface 415. By doing this, the control circuit 4102 at the side of portable device 410 can obtain the voltage information actually from the internal circuit 4052 at the side of battery pack 405. According to the voltage information actually from the internal circuit 4052, the control circuit 4102 performs temperature protection/detection, identification detection, and/or detection for existence of the battery cell 4051.

In practice, the transmitting circuit 4101 comprises a pull high resistor R4 and a protection resistor R5 (optional). The pull high resistor R4 is coupled to a port of a pull high voltage provided by the control circuit 4102. The pull high resistor R4 and protection resistor R5 are connected to the resistor unit 4053. The control circuit 4102 can detect or measure a divided voltage generated from the pull high voltage, pull high resistor R4, and the resistor unit 4053. According to the detected voltage result, the control circuit 4102 refers to a look-up table to check the detected voltage result and columns of the look-up table to determine whether the battery cell 4051 still exists, to determine whether to perform temperature protection, and/or to determine the identification of battery cell 4051. That is, the analog signal change generated from the resistor unit 4053 within internal circuit 4052 is transmitted/reflected to portable device 410 via the connecting interface 415 and can be equivalently sensed by the control circuit 4102 and transmitting circuit 4101. Accordingly, once the battery pack 405 or the battery cell 4051 becomes overheated, by sensing a divided voltage generated from the resistor unit 4053 and resistor unit 4103 and by referencing the look-up table, the control circuit 4102 equivalently can detect the temperature change of the battery pack 405 or battery cell 4051 so as to determine whether to perform temperature protection. Once the battery cell 4051 is removed or replaced by a different battery cell, by sensing a divided voltage generated from the resistor unit 4053 and resistor unit 4103 and by referencing the look-up table, the control circuit 4102 equivalently can detect the identification change of the battery cell 4051, and achieves the detection for battery cell identification. In addition, the control circuit 4102 may comprise an analog-to-digital converter for converting the divide voltage mentioned above into a digital signal so as to achieve precise temperature detection and protection. In addition, the control circuit 4054 used as a slave circuit can be arranged to provide identification information, temperature information, gauge information, near field communication (NFC) information, battery voltage information to the control circuit 4102 within the portable device 410 via the connecting interface 415.

Figure 5:
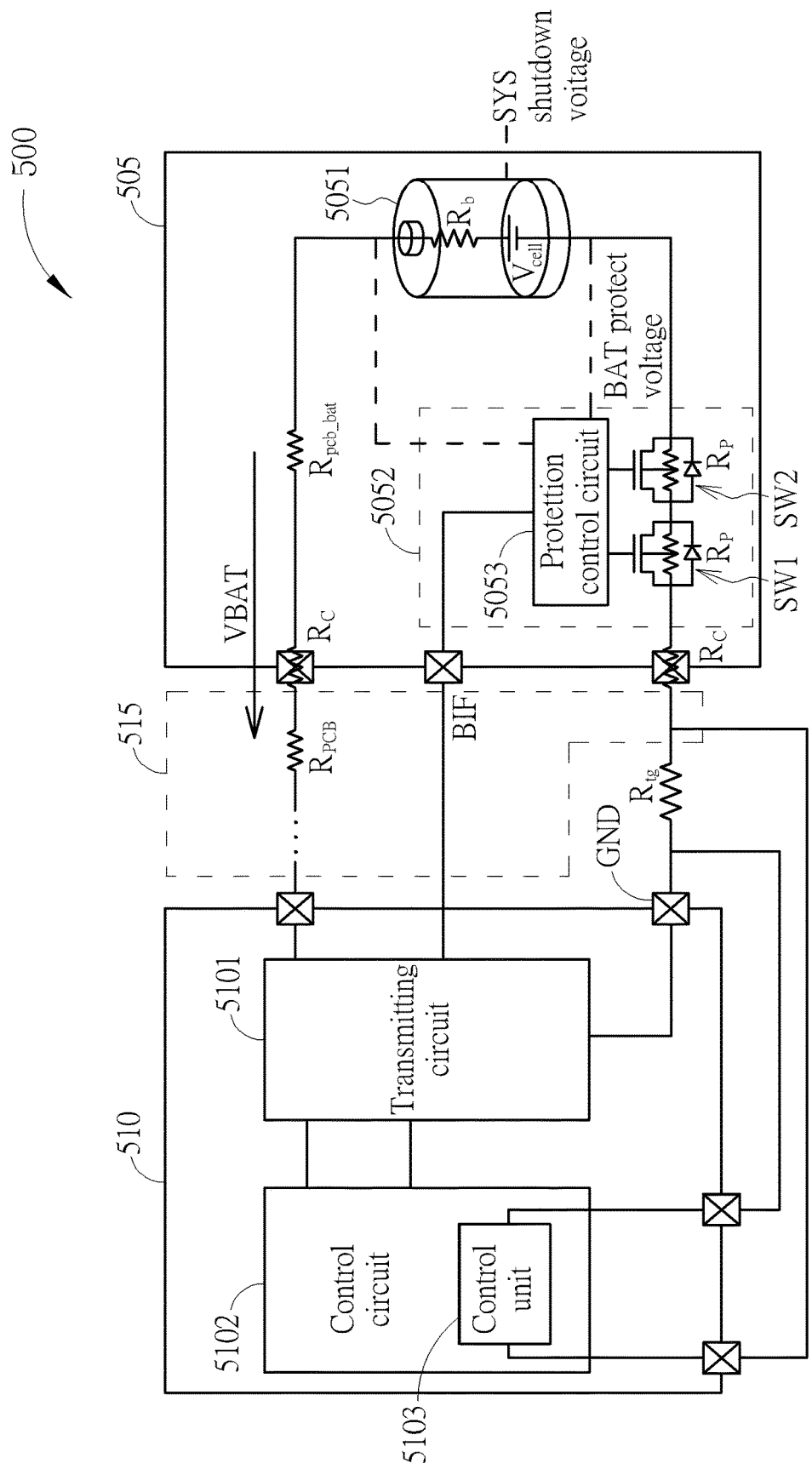
FIG. 5 is a diagram of a system according to a third embodiment of FIG. 1.

FIG. 5 is a diagram of a system 500 according to a third embodiment of FIG. 1. The system 500 comprises a battery pack 505 and a portable device 510 which is connected to the battery pack 505 via the connecting interface 515. The battery pack 505 comprises a battery cell 5051 and an internal circuit 5052. The internal circuit 5052 comprises a protection control circuit 5053 and a charging/discharging path that includes two switching units SW1 and SW2. The portable device 510 comprises a transmitting circuit 5101 and a control circuit 5102. The control circuit 5102 comprises a control unit 5103. The protection control circuit 5053 is used for controlling the two switching units SW1 and SW2 disposed on the charging/discharging path to charge or discharge the battery cell 5051. The protection control circuit 5053 can be also used for protecting the battery cell 5051. In addition, the protection control circuit 5053 can be used for storing information of control data, battery percentage, aging factor(s), battery cycle, battery capacity, and so on. Via the connecting interface 515, the control unit 5103 at the side of portable device 510 can read information of control data, battery percentage, aging factors, battery cycle, and battery capacity from the internal circuit 5052 at the side of battery pack 505. In addition, the control unit 5103 can also write information from the portable device 510 into the internal circuit 5052 within the battery pack 505 via the connecting interface 515. Accordingly, if the battery cell 5051 is removed and replaced by a new and different battery cell, the control unit 5103 can write information from the portable device 510 into the internal circuit 5052 within the battery pack 505 via the connecting interface 515 after calculating the information, to update the information mentioned above. For example, the information of battery percentage can be stored by the protection control circuit 5053 and can be also updated by the control unit 5103. The information of battery percentage is correct and is not lost, and thus this can avoid the problem of battery percentage change when a system reboots or an old battery cell has been replaced by a new battery cell. In addition, by doing this, the control circuit 5102 can be aware of that an old battery cell has been replaced by a new battery cell. Further, since the control unit 5103 for calculating the information to be stored in the protection control circuit 5053 is disposed at the side of portable device 510, total circuit costs can be reduced significantly.

Additionally, in another embodiment of FIG. 5, the control unit 5103 can be arranged to update the protection model/scheme that has been stored in the protection control circuit 5053 via the connecting interface. According to the updated model/scheme, the protection control circuit 5053 performs at least one of protection operations such as over-charge voltage protection, over-discharge voltage protection, discharge over-current protection, charge over-current protection, and short-circuit protection. In addition, via the connecting interface 515, the control unit 5103 can be arranged to retrieve the protection model/scheme that has been stored in the protection control circuit 5053. That is, the control unit 5103 at the side of portable device 500 can write a new protection model/scheme into the protection control circuit 5053 at the side of battery pack 510 via the connecting interface 515, to partially update or replace an old protection model/scheme which has been stored. The control unit 5103 at the side of portable device 500 can read the protection model/scheme, has been stored, from the protection control circuit 5053 at the side of battery pack 510 via the connecting interface 515. In addition, the control unit 5103 at the side of portable device 500 can be arranged partially update a portion of parameters of the protection model/scheme stored in the protection control circuit 5053 via the connecting interface 515. Accordingly, by updating the protection model/scheme via the connecting interface 515, the protection operations mentioned above become controllable and precise. For example, the equivalent resistance of the two switching units disposed on the charging/discharging path may be varied with different conditions such as different temperatures. The protection control circuit 5053 is arranged to detect voltage drops across the two switching units to determine whether to perform a protection operation, and the voltage drops may become different due to that the equivalent resistance of the two switching units SW1 and SW2 are different even though only the temperature condition is changed. By updating the protection model/scheme stored in the protection control circuit 5053 via the connecting interface 515, the protection control circuit 5053 can precisely and correctly perform the protection operations according to the updated protection model/scheme. It should be noted that the protection model/scheme stored in the protection control circuit 5053 at the side of battery pack 505 is programmable and adjustable.

Additionally, in another embodiment of FIG. 5, the control unit 5103 can be arranged to dynamically enable or disable a shipping mode for the protection control circuit 5053 or for the battery cell 5051 by sending a control signal to the internal circuit 5052 of battery pack 505 via the connecting interface 515, to effectively save more power of battery cell 5051. For example, when the system 500 is to be transferred from another place or country by ocean shipping or sea shipping for several days, the control unit 5103 can enable the shipping mode for the protection control circuit 5053 via the connecting interface 515 to disconnect all discharging loops/paths of the system 500 before the system 500 is transferred. Thus, this can avoid leakage of the battery cell 5051 when the system 500 is transferred for several days.

Figure 6A:
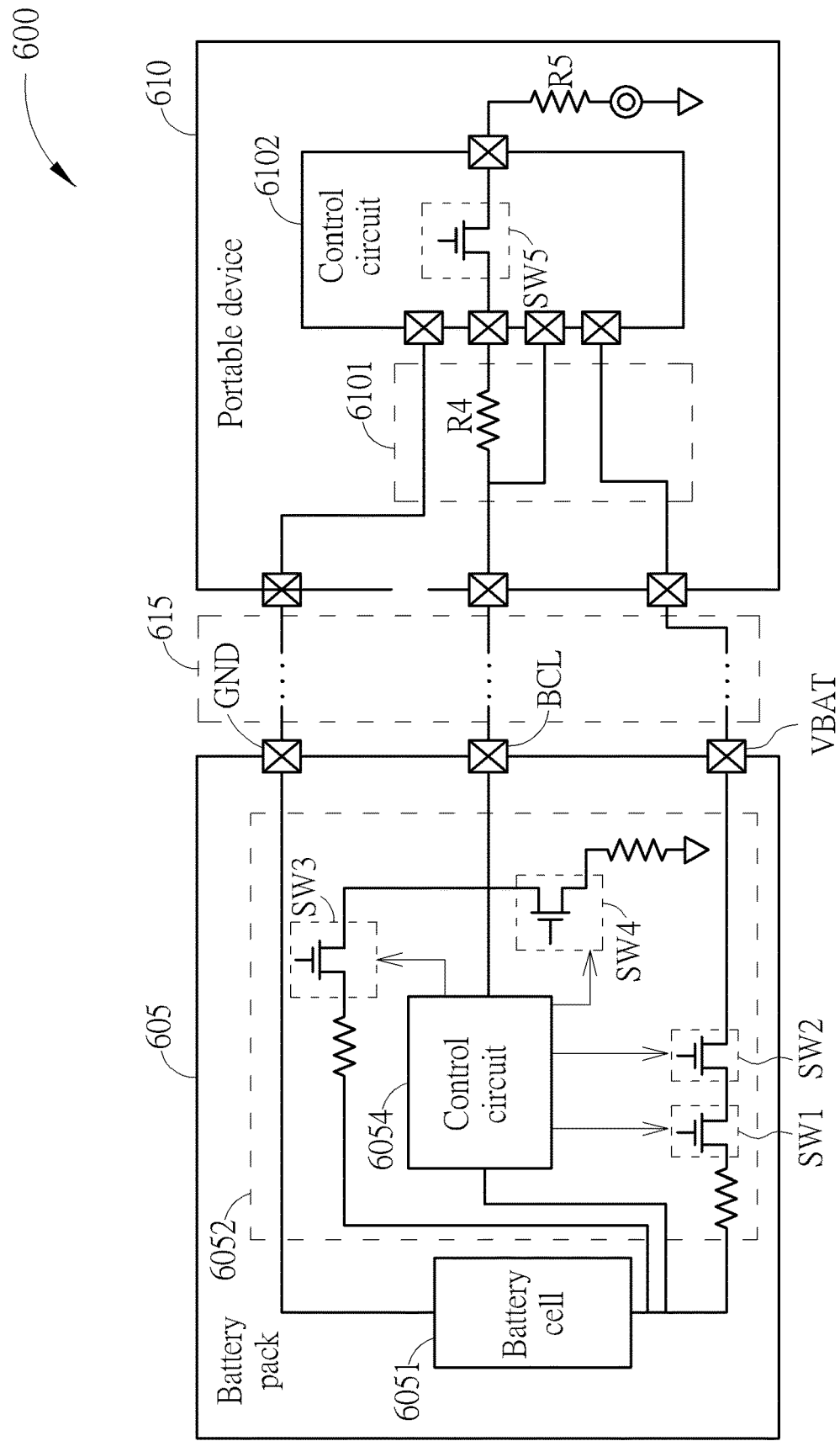
FIG. 6A is a diagram of a system according to a fourth embodiment of FIG. 1.
Figure 6B:
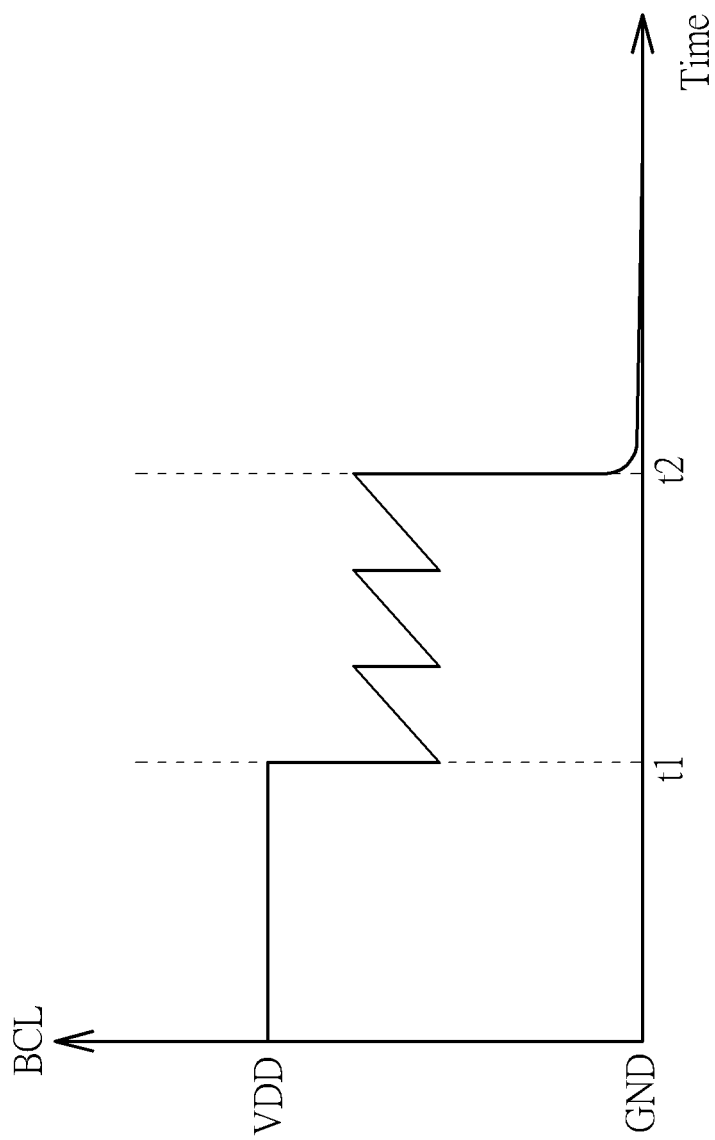
FIG. 6B is a diagram illustrating a waveform of BCL when the shipping mode is deactivated or released according to the embodiment of FIG. 6A.
Figure 6C:
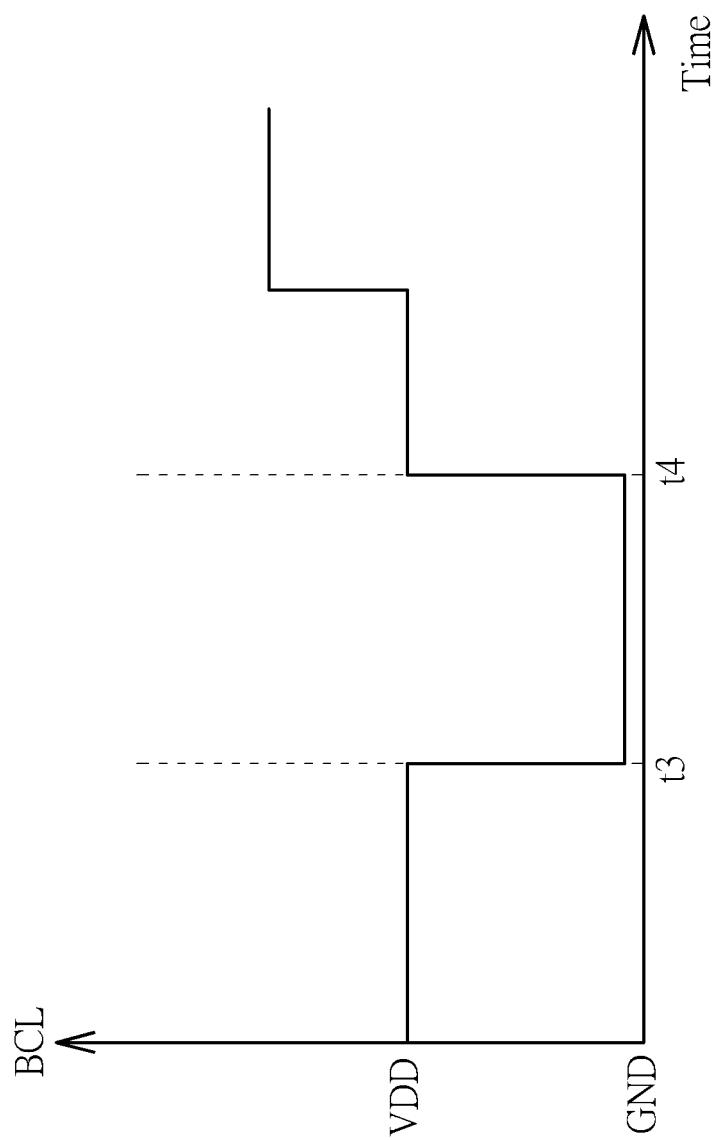
FIG. 6C is a diagram illustrating the waveform of BCL when the shipping mode is activated according to the embodiment of FIG. 6A.

Please refer to FIG. 6A in conjunction with FIG. 6B and FIG. 6C. FIG. 6A is a diagram of a system 600 according to a fourth embodiment of FIG. 1. FIG. 6B is a diagram illustrating a waveform of BCL when the shipping mode is deactivated or released according to the embodiment of FIG. 6A. FIG. 6C is a diagram illustrating the waveform of BCL when the shipping mode is activated according to the embodiment of FIG. 6A. As shown in FIG. 6A, the internal circuit 6052 comprises a control circuit 6054 and switching units SW1-SW4. The transmitting circuit 6101 comprises a resistor R4, and the control circuit 6102 comprises a switching unit SW5 that can be regarded as a power key connected to a resistor R5 and a power source. When the system 600 is under the shipping mode, the control circuit 6054 controls the switching units SW1 and SW2 to be open so that the path from the battery cell 6051 to level VBAT becomes disconnected. In addition, the control circuit 6054 controls the switching unit SW3 to be closed and the switching unit SW4 to be open under the shipping mode. Thus, under the shipping mode, the voltage level at BCL is almost equal to VDD. Since the control circuit 6054 merely consumes a smaller current and almost all discharging paths for the battery cell 6051 are disconnected, power-off leakage currents are almost zero. When a user enables the system 600 by pressing the power key, the switching unit SW5 becomes closed. The control circuit 6054 at the side of battery pack 605 can detect the level at BCL to know whether the user presses the power key. In this situation, to deactivating or releasing the shipping mode, the control circuit 6504 controls the switching unit SW3 to be open and the switching unit SW4 to be closed. Accordingly, the level at BCL is discharged via a resistor to the ground level GND and becomes lower. As shown in FIG. 6B, the vertical axis indicates the level at BCL, and the horizontal axis indicates different timings. Before timing t1, the system 600 is under the shipping mode. From timing t1 to timing t2, the system 600 performs shipping mode detection. After timing t2, the system 600 has released the shipping mode. The system 600 can enters the shipping mode again. To enter the shipping mode, from timing t3 to timing t4, the control circuit 6102 can send a shipping mode enable signal to the control circuit 6054 via the connecting interface 615. After receiving the shipping mode enable signal, the control circuit 6054 controls the switching units SW1 and SW2 to be open so that the discharging path from battery cell 6051 to ground level GND can be disconnected. In addition, the control circuit 6054 controls the switching unit SW3 to be closed and the switching unit SW4 to be open so that the voltage level of BCL can be kept at VDD. As shown in 6C, the control circuit 6054 can delay several seconds and then enter the shipping mode after receiving the shipping mode enable signal via the connecting interface such as battery communication line BCL a timing t4.

In addition, as shown in FIG. 1, the internal circuit 1052 can send a message/signal to the control circuit 1102 of portable device 110 via the connecting interface 115, to notify the portable device 110 of a pre-charging current, for achieving control of pre-charging current. For example, the internal circuit 1052 of battery pack 105 is arranged to notify the portable device 110 of the pre-charging current when the battery cell 1051 is almost empty and is to be charged with a charger. According to the pre-charging current, the portable device 110 can adaptively determine and use an optimized current for charging the battery cell 1051. Thus, the battery cell 1051 can be protected safely, and the total waiting time period for charging can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable device connected to a battery pack via a connecting interface, the battery pack comprising at least one battery cell, and the portable device comprises:
    a transmitting circuit, for transmitting signals from the connecting interface to a control circuit or from the control circuit to the connecting interface; and
    the control circuit, coupled to the transmitting circuit, for performing at least one control operation that is associated with the battery cell according to information for the battery cell;
    wherein there is an analog communication from the battery cell of the battery pack to the portable device to provide a voltage level actually from the battery cell.

2. The portable device of claim 1, wherein the information for the battery cell is transmitted from the battery pack to the portable, and the control circuit receives the information for the battery cell from the transmitting circuit via the connecting interface.

3. The portable device of claim 2, wherein the information for the battery cell comprises an interrupt event/signal transmitted from the battery pack via the connecting interface, and the control circuit performs the at least one control operation when receiving the interrupt event/signal.

4. The portable device of claim 3, wherein the interrupt event/signal is a high voltage interrupt event/signal, and the control circuit controls a current used for charging the battery cell to decrease the current when receiving the high voltage interrupt event/signal, so as to use a smaller current for charging the battery cell.

5. The portable device of claim 3, wherein the interrupt event/signal is a low voltage interrupt event/signal, and the control circuit controls a current used for charging the portable device from the battery cell to decrease the current when receiving the low voltage interrupt event/signal, so as to shut down the portable device.

6. The portable device of claim 2, wherein the information for the battery cell comprises a voltage level actually from the battery cell; and, the control circuit compares the voltage level with a target threshold to determine whether to perform the at least one control operation that is associated with the battery cell when receiving the voltage level actually from the battery cell via the connecting interface.

7. The portable device of claim 6, wherein the target threshold is a high voltage threshold, and the control circuit controls a current used for charging the battery cell to decrease the current when the voltage level actually from the battery cell reaches the high voltage threshold, so as to use a smaller current for charging the battery cell.

8. The portable device of claim 6, wherein the target threshold is a low voltage threshold, and the control circuit controls a current used for charging the portable device from the battery cell to decrease the current when the voltage level actually from the battery cell reaches the low voltage threshold, so as to shut down the portable device.

9. The portable device of claim 2, wherein the information for the battery cell comprises at least one of identification information of the battery cell and temperature information of the battery cell; and, the control circuit senses at least one of the identification information and the temperature information by detecting a voltage dividing result generated by the transmitting circuit and the battery pack, and performs at least one of battery existence detection and temperature protection according to the sensed at least one of the identification information and the temperature information.

10. The portable device of claim. 2, wherein the control circuit reads the information for the battery cell from an internal circuit of the battery pack via the transmitting circuit and the connecting interface.

11. The portable device of claim 10, wherein the control circuit updates the information for the battery cell that has been stored by the internal circuit of the battery pack via the transmitting circuit and the connecting interface.

12. The portable device of claim 1, wherein the control circuit writes the information for the battery cell into an internal circuit of the battery pack via the transmitting circuit and the connecting interface.

13. The portable device of claim 1, wherein the information for the battery cell comprises information for at least one of a voltage level from the battery cell, control data, battery percentage, aging factors, battery cycle, battery capacity, over-charge voltage protection, over-discharge voltage protection, discharge over-current protection, charge over-current protection, short-circuit protection, and a pre-charging current for initially charging.

14. The portable device of claim 1, wherein the control circuit is further arranged to dynamically enable or disable a shipping mode for the battery cell by sending a control signal to an internal circuit of the battery pack via the connecting interface.

15. A battery pack connected to a portable device via a connecting interface, comprises:
a battery cell; and
an internal circuit, coupled to the battery cell, for transmitting information for the battery cell from the battery pack to the portable device via the connecting interface;
wherein the information for the battery cell comprises at least one of information actually from the battery cell and information that has been stored by the internal circuit; and, there is an analog communication from the battery cell of the battery pack to the portable device to provide a voltage level actually from the battery cell.

16. The battery pack of claim 15, wherein the information for the battery cell comprises an interrupt event/signal; the internal circuit compares a voltage level from the battery cell with a target threshold to determine whether to transmit the interrupt event/signal to the portable device via the connecting interface.

17. The battery pack of claim 16, wherein the interrupt event/signal is a high voltage interrupt event/signal, and the target threshold is a high voltage threshold; and, the internal circuit transmits the high voltage interrupt event/signal to the portable device via the connecting interface when the voltage level from the battery cell becomes higher and reaches the high voltage threshold.

18. The battery pack of claim 16, wherein the interrupt event/signal is a low voltage interrupt event/signal, and the target threshold is a low voltage threshold; and, the internal circuit transmits the low voltage interrupt event/signal to the portable device via the connecting interface when the voltage level from the battery cell becomes lower and reaches the low voltage threshold.

19. The battery pack of claim 15, wherein the internal circuit is arranged to transmit a voltage level actually from the battery cell to the portable device via the connecting interface.

20. The battery pack of claim 15, wherein the information for the battery cell comprises information for at least one of a voltage level from the battery cell, control data, battery percentage, aging factors, battery cycle, battery capacity, over-charge voltage protection, over-discharge voltage protection, discharge over-current protection, charge over-current protection, short-circuit protection, and a pre-charging current for initially charging.

21. The battery pack of claim 15, wherein the internal circuit dynamically enables or disables a shipping mode for the battery cell according to a control signal transmitted from the portable device to the internal circuit of the battery pack via the connecting interface.

22. A method used between a portable device and a battery pack including at least one battery cell, comprising:
transmitting information for the battery cell from the portable device to the battery pack via the connecting interface or from the battery pack to the portable device via the connecting interface; and
according to the information for the battery cell, performing at least one control operation that is associated with the battery cell;
wherein there is an analog communication from the battery cell of the battery pack to the portable device to provide a voltage level actually from the battery cell.

23. The method of claim 22, wherein the information for the battery cell comprises at least one of information actually from the battery cell and information that has been stored by an internal circuit within the battery pack.

24. The method of claim 22, wherein the information for the battery cell comprises information for at least one of a voltage level from the battery cell, control data, battery percentage, aging factors, battery cycle, battery capacity, over-charge voltage protection, over-discharge voltage protection, discharge over-current protection, charge over-current protection, short-circuit protection, and a pre-charging current for initially charging.

* * * * *